(No Model.) 2 Sheets—Sheet 2.

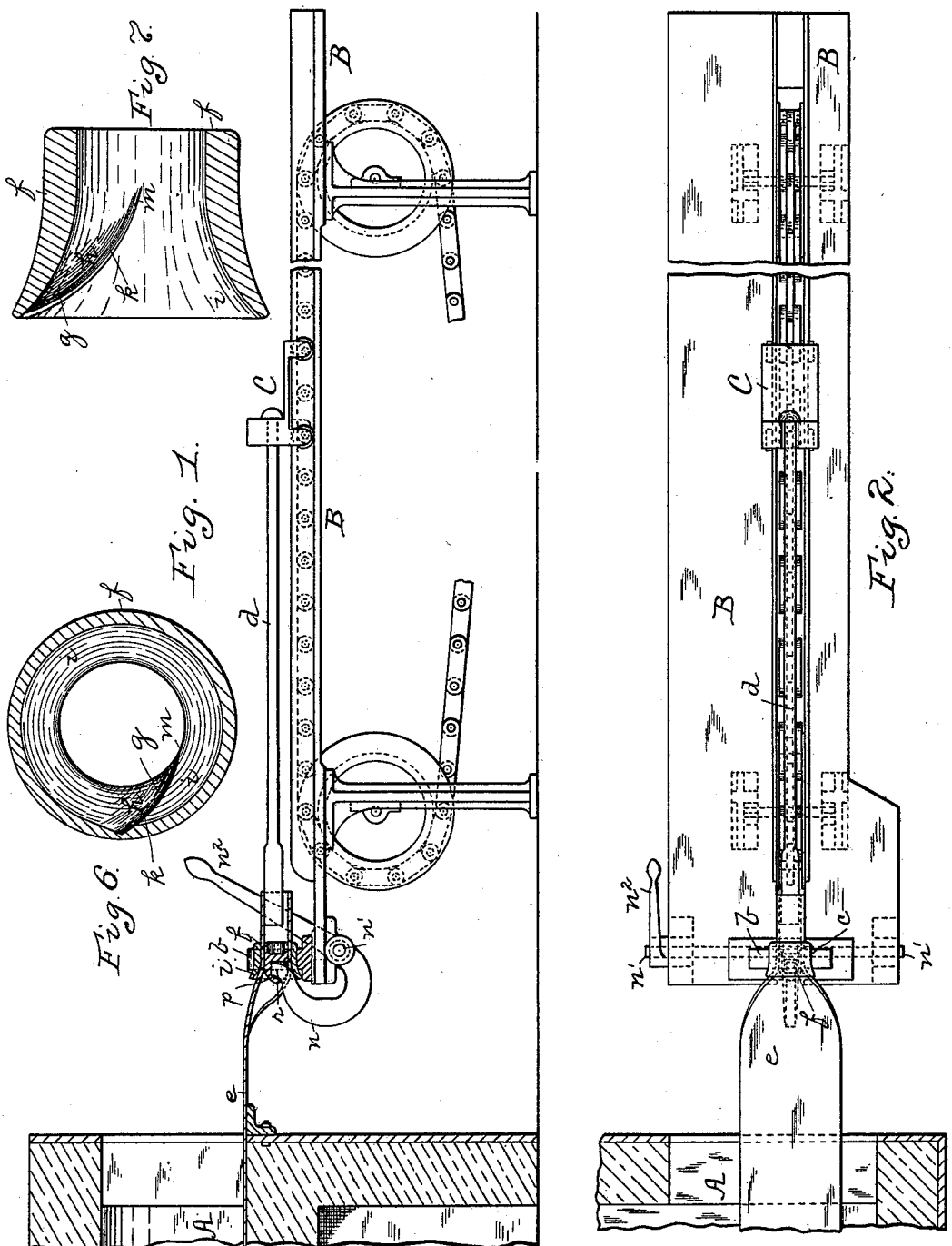

R. C. CRAWFORD.
APPARATUS FOR MANUFACTURING TUBING.

No. 582,848. Patented May 18, 1897.

Witnesses:
Inventor.
Rufus C. Crawford
By Kay, Totten & Cooke
Attorneys.

UNITED STATES PATENT OFFICE.

RUFUS C. CRAWFORD, OF McKEESPORT, PENNSYLVANIA, ASSIGNOR OF TWO-THIRDS TO ADOLPH CHAUDON AND CHARLES PATTERSON, OF SAME PLACE.

APPARATUS FOR MANUFACTURING TUBING.

SPECIFICATION forming part of Letters Patent No. 582,848, dated May 18, 1897.

Application filed May 8, 1893. Serial No. 473,352. (No model.)

*To all whom it may concern:*

Be it known that I, RUFUS C. CRAWFORD, a resident of McKeesport, in the county of Allegheny and State of Pennsylvania, have invented a new and useful Improvement in Apparatus for the Manufacture of Tubing; and I do hereby declare the following to be a full, clear, and exact description thereof.

My invention relates to apparatus for the manufacture of lap-weld tubing, this tubing being formed of plates of metal having the edges thereof beveled and these edges lapped the one over the other and welded together.

The object of the invention is to provide simple and durable mechanism for welding lap-weld tubing in the ordinary bell without the necessity of mounting rolls or like antifriction devices therein and to support the pipe during the welding within this bell.

The particular points of invention desired to be covered will be hereinafter set forth and claimed.

To enable others skilled in the art to make and use my invention, I will describe the same more fully, referring to the accompanying drawings, in which—

Figure 3:
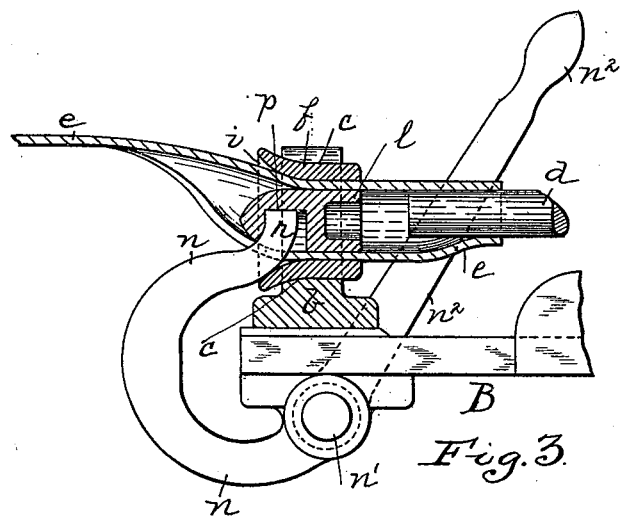
Figure 4:
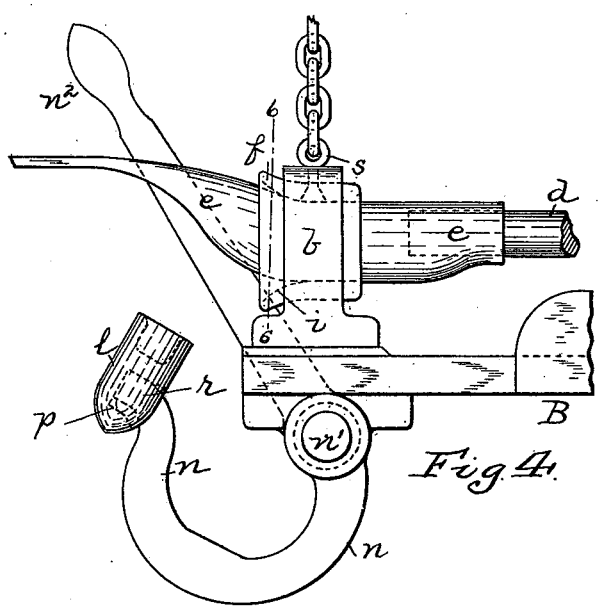
Figure 5:
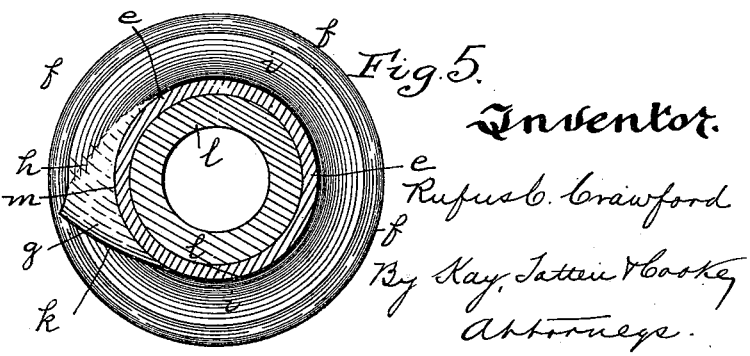

Figure 1 is a side view, partly in section, showing the furnace and the draw-bench and illustrating the method of welding the blank. Fig. 2 is a top view, partly broken away, of the same. Fig. 3 is an enlarged longitudinal sectional view of the bell, showing the welding-ball in position for welding. Fig. 4 is a side view of the same. Fig. 5 is a face view of the bell. Fig. 6 is a sectional view on the line 6 6, Fig. 4; and Fig. 7 is an enlarged view of the bell.

Like letters indicate like parts in each.

The furnace A is of the ordinary or any approved form for heating the blank, and the draw-bench B is also of any suitable form and length, the drawing-carriage C being mounted to travel thereon and having a suitable device to connect to the drawing-tag $d$. At the forward end of the draw-bench is the bell-holder $b$, which has a slot $c$ in the upper end thereof to permit the passage of the drawing-tag $d$, which is secured to the blank $e$ in the ordinary way, these parts being the usual parts employed with the ordinary mechanism for butt-welding. The welding-bell $f$, as more clearly shown in Figs. 5 and 6, is the ordinary bell employed for butt-welding, except that it has formed in one part of the flaring face $i$ thereof a depression $g$ to receive one of the edges of the blank, one face of said depression rising gradually to the general contour of the bell, as at $h$, while the other face is an abrupt shoulder $k$, the upper edge of which is the same height as the general contour of the bell. The purpose of such depression is to permit one of the beveled edges of the blank to enter the same and so drop below the other beveled edge, which is directed into tube form by the flaring mouth of the bell, so that it is directed over the edge, which drops into the depression, and in this way the two beveled edges of the blank are caused to lap over each other, and so brought into proper position for welding. The welding portion of the bell, where the tube is compressed in forming the weld, is of course cylindrical, and the depression $g$ gradually rises up to this cylindrical portion, so that the edges of the blank are properly compressed together within the bell, it being preferred that this depression extend into the narrow or welding portion of the bell, so that the two beveled edges of the blank are not forced into contact until they come into the portion of the bell in which the weld takes place. Such depression so provides for the carrying of one beveled edge under the other into the proper position for the forming of the weld and then the forcing of the two beveled edges into contact, so that there is no necessity of the two beveled edges sliding over each other within the bell—that is to say, the two edges are in this way brought into proper position and the lower or outer beveled edge is then raised against the upper or inner beveled edge, so that their faces are stuck and welded by the direct contact thereof without the neccessity of their moving over each other. The portion of the depression $g$ where it gradually fades up to the cylindrical welding portion of the bell is shown at $m$. It is evident that in order to hold the welding-bell in proper relative position to the blank, so that the depression $g$ will always be in proper position to receive one beveled edge and direct it under the other beveled edge, it is necessary that the bell shall always be held in proper relative position within the bell-holder, and for this purpose I provide upon the bell a block or extension $s$, fitting within the recess $c$ at the upper end of the bell-holder, through which the drawing-tag drops when the blank is being brought into position for welding. This extension may either be separate from and secured to the bell or may be cast as part thereof, and as the bell is drawn to the seat in the bell-holder it will direct the bell into proper position for the welding operation.

For practical purposes I prefer to support the bell by a chain or like device which can be connected to this extension and hold the bell in proper position to enter the bell-holder, though of course the bell could be directed by the operator into the bell-holder in such position that its extension would fit within the recess of the bell-holder.

In order to weld the two beveled edges and provide a means for forcing the same into contact with each other, I employ the welding-ball $l$, which corresponds in size to the interior diameter of the tube and is carried on the ball-supporting arm $n$, this ball-supporting arm being pivoted to the frame of the draw-bench at $n'$ and being operated by a lever $n^2$. The arm is curved, as shown, so as to provide for the bringing of the ball into the exact position within the bell desired and yet bring the lever into proper position for handling by the operator, and in order to mount the ball on this arm I provide the seat $p$ in the side of the ball $l$ into which the end $r$ of the arm enters, such seat being angular, so as to hold the ball in proper position to enter the blank and pass into the bell after the blank has been drawn into the bell a sufficient distance to enable the ball to clear the welding-tag. In this way the ball may be brought to place and held in the proper position for welding, and at the same time the ball can be quickly changed upon its supporting-arm, the movement of withdrawing the ball from the bell being such as will discharge that ball from the arm and leave it free to receive another ball.

In making lap-weld tubing with the apparatus above described the blank is either rolled with beveled edges or the edges beveled by suitable means after the rolling of the blank, and the drawing-tag $d$ is then welded to the blank at the ordinary tagging-fire, and the blank is then inserted within the furnace and raised to the welding heat. As soon as the blank is brought to the proper heat the operator passes the welding-bell over the drawing-tag and drops the bell in front of the bell-holder, and he then connects the drawing-tag to the carriage and the carriage to the traveling chain of the draw-bench, and the bell is drawn into the bell-holder, its extension $s$ fitting within the recess $c$ thereof, so that it is brought to proper position for the welding operation, and as soon as the portion of the tag welded to the plate is drawn through the bell the operator, by means of the lever $n^2$, raises the welding-ball so that it enters within the welding-bell, and as a result forms the anvil against which the lapped edges of the blank are forced within the bell to cause the welding of such lapped edges. As the blank is drawn through the bell the one beveled edge thereof is directed by the flaring face of the bell into the proper form, so as to project that beveled edge above the depression $g$ of the bell, and the other beveled edge enters such depression and drops below the inner beveled edge, so that when traveling in such depression it is brought under the first beveled edge and lapped past the same, so that the two beveled edges are thus brought into proper position for the welding thereof together. By this means the two edges are thus lapped and are then, when drawn through the narrowest or welding portion of the bell, brought into contact with sufficient force when confined between the body of the bell and the welding-ball to cause the proper welding of such beveled edges together, so lap-welding the tube within the bell. During this operation the welding-ball also serves the other function of holding the tube to proper shape, insuring the cylindrical form of the tube and preventing the sagging of the body thereof, and also acts to smooth or size the interior of the tube in the same way that the bell smoothes or sizes the exterior thereof. In this way the lap-weld tubing can be rapidly formed from the flat plate at no more expense than found in the formation of butt-weld tubing, except that of beveling the edges of the plate, which for the mass of the smaller sizes of tubing can be accomplished in the rolling of the plate.

What I claim as my invention, and desire to secure by Letters Patent, is—

1. In apparatus for forming lap-weld tubing, the combination with a draw-bench, of a welding-bell having a flaring portion and a welding portion corresponding to the exterior diameter of the tube formed, and having in one part of the flaring face thereof a depression to receive one of the beveled edges of the skelp and direct the same under the other beveled edge thereof, such depression extending into the welding portion of the bell and gradually tapering off at the point of smallest diameter of the bell, and an interior support for the tubing at the point of weld, substantially as and for the purposes set forth.

2. In apparatus for forming tubing, the combination of a draw-bench having a bell-holder at the forward end, a ball-support pivoted to the draw-bench below the bell-holder, and a ball carried by said support and adapted to enter the welding-bell, substantially as set forth.

3. In apparatus for forming tubing, the combination of a draw-bench having a bell-holder at the forward end, and a ball-support pivoted to the draw-bench on about the same vertical plane as the bell-holder but below the same, said ball-support being curved so as to bring the ball in proper position within the bell held in the bell-holder, substantially as set forth.

4. In apparatus for forming tubing, the combination of a draw-bench having a bell-holder at the forward end, a ball-support pivoted on said draw-bench, and a ball having a seat in the side thereof to fit upon the ball-support and support the same within the welding-bell, substantially as set forth.

In testimony whereof I, the said RUFUS C. CRAWFORD, have hereunto set my hand.

RUFUS C. CRAWFORD.

Witnesses:
S. M. LYNCH,
D. GEO. BECKETT.